Sept. 26, 1961 W. ERNST 3,001,233
APPARATUS FOR PLASTIC INJECTION
Filed Jan. 22, 1959 2 Sheets-Sheet 2
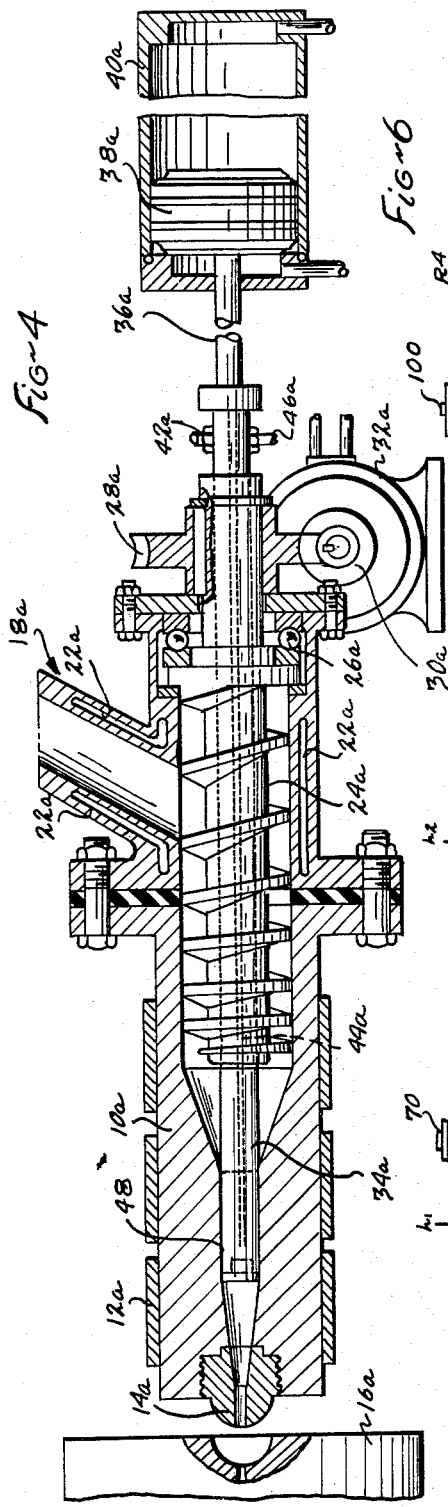
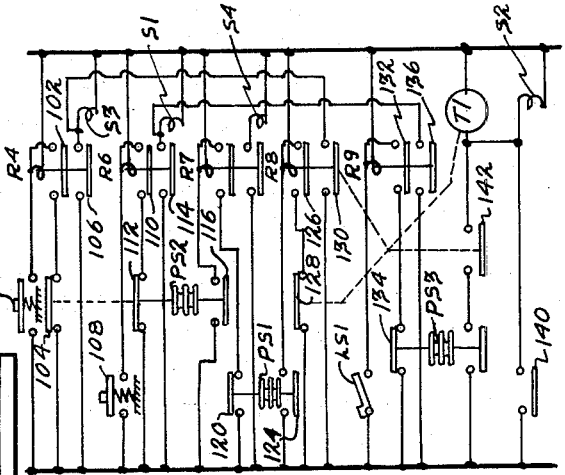
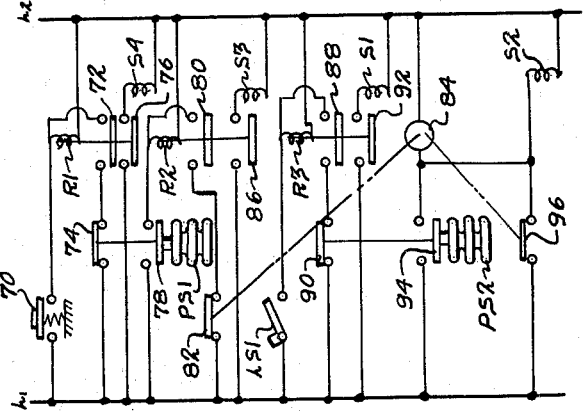
INVENTOR.
WALTER ERNST
BY Toulmin & Toulmin
ATTORNEYS

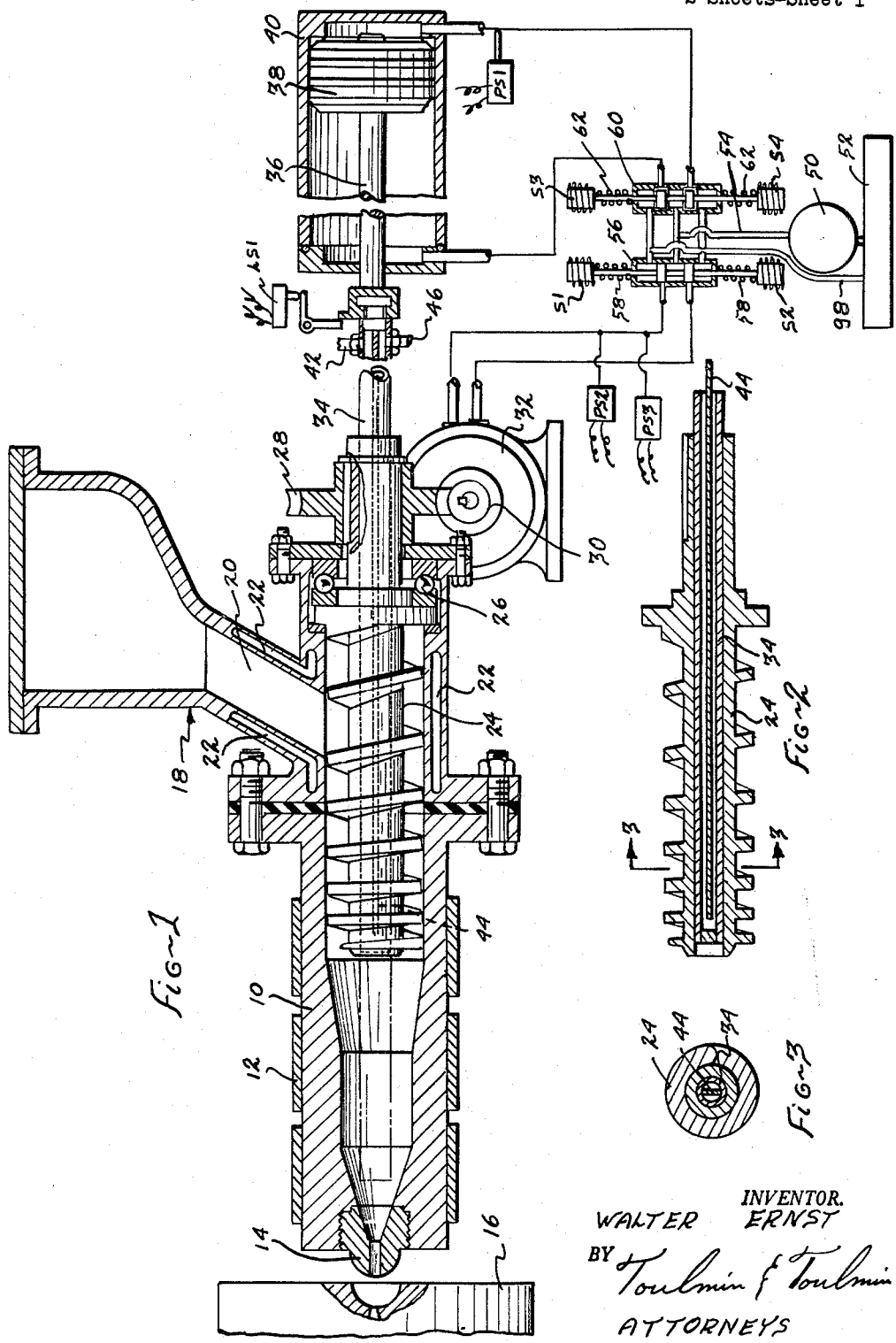

United States Patent Office 3,001,233
Patented Sept. 26, 1961

3,001,233
APPARATUS FOR PLASTIC INJECTION
Walter Ernst, Dayton, Ohio, assignor to The Commonwealth Engineering Company of Ohio, Dayton, Ohio, a corporation of Ohio
Filed Jan. 22, 1959, Ser. No. 788,443
6 Claims. (Cl. 18—30)

This invention relates to a method and apparatus for forming plastic articles and is particularly concerned with mechanism for forcing plastic material into the cavities of molds.

In the molding of plastic articles, plastic material in a flowable condition is placed within the confines of a mold cavity and is caused to solidify within the cavity. One way in which this is accomplished is by plasticizing the plastic material by heating in a cylinder and forcing the plasticized material from the cylinder into a closed cavity and within which cavity the material sets up upon cooling therein.

The usual arrangement of this sort has a chamber into which the plastic material is delivered and wherein it is plasticized and there is a plunger in the cylinder which forces the plastic therefrom through a nozzle into the sprue of a mold and which sprue communicates with the mold cavity. An arrangement of this sort is limited as to capacity because no more material can be discharged from the cylinder than will be displaced by the plunger. Further, the plastic material is usually delivered into the cylinder by a gravitational feed and is thus loosely disposed therein and then heating of the plastic material, which takes place by conduction through the plastic material from the heated cylinder walls, is slow and nonuniform.

In some cases a heated torpedo is disposed within the cylinder but such a torpedo occupies considerable space and increases the length of the cylinder.

Even when granular plastic material is compacted it is a poor conductor of heat so that the plasticizing of the material solely by the application of heat is slow and sometimes excessive heat outside of the body of plasticized material is required before the inside of the body becomes sufficiently plasticized.

Having the foregoing in mind, a primary object of the present invention is to devise an arrangement whereby plastic material can be handled in large volumes and relatively rapidly with equipment substantially no larger than what is employed at the present time.

Another object of this invention is the provision of an arrangement for handling plastic material, particularly heat plasticizable plastic material so that the heating hereof is more rapid and more efficient than heretofore has been possible with the usual apparatus.

Another object of this invention is the provision of a relatively simple apparatus for handling plastic material on which the advantages of a large capacity machine can be obtained without the machine being any larger than machines according to the prior art which are relatively small.

It is also an object of this invention to provide an arrangement for handling granular plasticizable materials in which a minimum of heat is required to plasticize the material preparatory to the molding thereof.

A still further object of this invention is the provision of a new method of plasticizing heat plasticizable plastic material and transferring the thus plasticized material into a mold cavity.

These and other objects and advantages will become more apparent upon reference to the drawings in which:

FIGURE 1 is a vertical longitudinal section through a machine constructed according to my invention;

FIGURE 2 is a longitudinal section taken through the extrusion screw and the injection plunger of the machine;

FIGURE 3 is a transverse cross-section through the extrusion screw and injection plunger as indicated by line 3—3 on FIGURE 2;

FIGURE 4 is a longitudinal section similar to FIGURE 1 showing a somewhat modified arrangement;

FIGURE 5 is a diagrammatic representation of one typical electric control circuit for controlling the machine; and FIGURE 6 is a view like FIGURE 5 but showing a somewhat modified arrangement.

Referring to the drawings somewhat more in detail, FIGURE 1 shows an apparatus according to this invention in which there is a cylinder 10 provided with heating means 12 which, for example, by electric resistance heaters.

Cylinder 10 has a nozzle 14 at one end adapted for engagement with a mold 16 of a conventional type which has cavities to be filled with plastic material. The end of cylinder 10 opposite the nozzle is attached to a hopper structure 18 into which the material to be plasticized and transferred to the mold is introduced. The hopper communicates with the cylinder via passage 20 and the portion of the hopper structure adjacent the heated cylinder is provided with cooling passages 22 to prevent the material from becoming plasticized therein and sticking to the hopper structure surface.

Located within the end of the cylinder toward the hopper structure and extending into the bore in the hopper structure that is aligned with the cylinder is a rotatable extrusion screw 24. This screw is of decreasing pitch from right to left so that as it rotates material is moved toward the heated cylinder.

Screw 24 is supported at its right end by thrust bearing means 26 and at its extreme right end carries worm wheel 28 engaged by worm 30 on the shaft of a reversible rotary hydraulic motor 32.

Screw 24 is hollow, and reciprocably mounted therein is an injection plunger 34 which at its right end is connected with ram 36 that is connected with piston 38 in cylinder 40.

Rotation of screw 24 advances material from hopper toward the heated cylinder and compacts the material within the cylinder. The granular material is gradually compacted as it moves along the screw and, simultaneously, the material is worked by the screw so that a substantial amount of the rotative effort exerted on the screw is converted into heat within the plastic material. This brings about a uniform heating of the body of material throughout so that by the time the material is discharged from end of the screw into the cylinder 10 it is completely plasticized and is in condition for molding, thus, the amount of heat supplied to the cylinder 10 by the heating means 12 need only be sufficient to maintain the plastic material at the proper temperature. The plasticizing of the material is accomplished by working thereof as the screw rotates.

Actuation of plunger 34 to move it leftwardly will then cause material to be forced from the cylinder through the nozzle into mold 16. A high pressure can be developed on the material in this manner and the aforementioned screw, because of its small pitch at the left end will prevent the material from flowing backwardly along the screw.

The injection plunger is preferably cooled by passing a cooling fluid therethrough which is accomplished by supplying cooling fluid through a conduit 42 with the fluid then passing down along the one side of the divider member 44 to the forward end of the injection plunger and then backwardly along the other side of the divider member where the fluid is discharged through conduit 46.

The modification of FIGURE 4 is the same as the modification of FIGURE 1 and bears corresponding numerals with the addition of subscript "a," except that in the FIGURE 4 modification the portion 48 of cylinder 10a is of the same size as injection plunger 34a so that when the injection plunger is advanced the material is trapped ahead of the injection plunger and higher pressures can therefore be built up on the material than in the FIGURE 1 modification.

In either case if the material becomes sufficiently flowable when plasticized, it can be extruded from the nozzle by rotation of the screw until the mold cavity is substantially filled and the injection plunger can be advanced to ram the material tight in the mold cavity.

In cases where the material does not become sufficiently plasticized to be discharged in the above described manner, it will still be packed tightly in the heated end of the cylinder and thus become molten throughout whereupon it can be quickly and efficiently transferred into the mold cavity by the injection plunger.

In operation, where the material is merely packed into the injection cylinder by rotation of screw, following the filling of a mold cavity, the ejection plunger is retracted, and then the screw operates to advance the material immediately in the cylinder and after a predetermined pressure is built up on the material, the screw will retract slightly to relieve the pressure at the nozzle so that the material will not seep therefrom when the cylinder is separated from the mold. The cylinder is then retracted from the mold and the mold is opened and the formed articles are removed therefrom. The mold is then closed and returned against the end of the cylinder, and a new injection cycle is initiated.

Where the screw actually accomplishes extrusion, the cycle is commenced by bringing the mold against the end of the cylinder, then rotating the screw until a certain pressure is built up. The screw is then halted and the injection plunger is brought forward to ram the material into the mold cavity. The injection plunger is then retracted and the screw rotates to fill the injection cylinder. At a predetermined pressure the screw is stopped and backs up a small amount to relieve the pressure at the nozzle end of the cylinder, then the mold is retracted and opened to remove the molded articles.

For actuating the two hydraulic motors there is a pump 50 that draws fluid from a tank 52 and supplies it under pressure to pressure conduit 54. Pressure conduit 54 leads to the inlet of a closed center four-way reversing valve 56 which has service conduits leading to the opposite sides of rotary motor 32. The valve member of valve 56 is normally centered by springs 58 and is movable in one direction by energization of solenoid S1 and in the other direction by energization of a solenoid S2.

Conduit 54 also leads to the pressure inlet of an open center four-way reversing valve 60, the service ports of which are connected with opposite ends of cylinder 40. Springs 62 normally center the valve member of valve 60 while energization of a solenoid S3 will shift the valve member in one direction and energization of solenoid S4 will shift it in the opposite direction.

Connected with the advancing side of piston 38 is a pressure switch PS1, while connected with the advancing side of motor 32 are pressure switches PS2 and PS3.

The circuit of FIGURE 5 is employed when the device is operated so that the extrusion screw merely packs the cylinder with material.

In this circuit a start switch 70, when closed, energizes a relay R1 which has a holding blade 72 that completes a holding circuit through the normally closed blade 74 of pressure switch PS1. Another blade 76 of relay R1 is in circuit with solenoid S4, which, when energized, moves the valve member of valve 60 downwardly thus connecting the pressure conduit with the advancing side of piston 38 and causing an injection operation.

When a predetermined pressure is built up on the advancing side of piston 38, indicating that the desired pressure on the plastic material in the mold has been attained, pressure switch PS1 will be actuated and this will open blade 74 thereof de-energizing relay R1 and solenoid S4 while closing blade 78 of the pressure switch which will energize relay R2. Relay R2 holds through its blade 80 and a normally closed blade 82 of a timer 84. Blade 86 of relay R2 energizes solenoid S3 which shifts the valve member of valve 60 to bring about retraction of piston 38 and the injection plunger. As the injection plunger approaches its retracted position it actuates a limit switch LS1 which energizes a relay R3 which holds through its blade 88 and a normally closed blade 90 on pressure switch PS2 pertaining to motor 32.

Relay R3, through its blade 92, energizes solenoid S1 which shifts the valve member of valve 56 in a direction to supply fluid to the advancing side of motor 32. The extrusion screw now runs and packs material in the hot end of cylinder 10. When a predetermined pressure is built up on this material, pressure switch PS2 is actuated to open its blade 90 thus de-energizing relay R3 which de-energizes solenoid S1 and stops motor 32. Simultaneously blade 94 of pressure switch PS2 closes and energizes timer 84 which holds through its blade 96. Closing of blade 94 also energizes solenoid S2 which shifts the valve member of valve 56 to reverse motor 32. After a brief interval, sufficient for the pressure to be relieved on the plastic material in the cylinder, blade 96 will open thus de-energizing timer 84 and solenoid S2. At the same time blade 82 of timer 84 opens thus de-energizing relay R2 which, in turn, de-energizes solenoid S3. At this time all of solenoids S1, S2, S3 and S4 are de-energized so that both of valves 56 and 60 are centered and pump 50 will by-pass freely through valve 60 to the exhaust manifold 98 and back to tank 52 so that whenever the apparatus is idle substantially no power is consumed by the pump.

When the machine is operated so that the extrusion screw forces material into the mold cavity the circuit of FIGURE 6 may be employed.

In this circuit closing of a switch 100 will energize a relay R4 which holds through its blade 102 and a normally closed blade 104 of pressure switch PS2 connected with the advancing side of motor 32. Blade 106 of relay R4 energizes solenoid S3 of the valve 60 so that the valve is shifted to interrupt the by-pass from the pump to the tank thereby to develop pressure in the hydraulic system. Switch 108 is then closed and this energizes relay R6 that holds through its blade 110 and the normally closed blade 112 of pressure switch PS2. Blade 114 of relay R6 energizes solenoid S1 of valve 56 to cause motor 32 to run in the advancing direction. After a predetermined pressure has been built up on the advancing side of the motor 32 pressure switch PS2 is actuated to open its blades 104 and 112 thus de-energizing relays R4 and R6 and solenoid S3 and S1. Blade 116 of the switch closes at this time and energizes relay R7 which holds through its blade 118 and a normally closed blade 120 of pressure switch PS1 connected with the advancing side of piston 38. Blade 122 of relay R7 energizes solenoid S4 of valve 60 and this causes advancing movement of the piston 38 and the injection plunger. At a predetermined pressure on the advancing side of piston 38 pressure switch PS1 is actuated to open its blade 120 which de-energizes relay R7 and solenoid S4 while simultaneously blade 124 of the pressure switch closes to energize relay R8. Relay R8 holds through its blade 126 and a timer blade 128 of a timer T1. Relay R8 also has a blade 130 in circuit with solenoid S3 so that this solenoid is energized to cause retraction of the piston 38 and the injection plunger. As the injection plunger approaches its rearmost position it closes limit switch LS1 which energizes relay R9 that holds through its blade 132 and a normally closed blade 134 of pressure switch PS3 also connected with the advancing side of motor 32. Relay R9 also has a blade 136 connected in circuit with solenoid S1 of the valve 56 so that energization of relay R9 causes motor 32 to run in the advancing direction. When a predetermined pressure is built up on the advancing side of motor 32, preferably less than the pressure required to actuate switch PS2, switch PS3 will be actuated thus opening its blade 134 to de-energize relay R9 and solenoid S1 while closing its blade 138 to energize timer T1. When timer T1 is energized its blade 104 is closed to energize valve solenoid S2 of the valve 56 to cause the extrusion screw to run in the opposite direction to relieve the pressure on the plastic material therein and thereafter blade 140 will open to de-energize the timer and the solenoid S2 and blade 128 will also open to de-energize relay R8 and valve solenoid S3 so that the valves both return to their neutral position and the pump again by-pass to the tank.

To prevent timer T1 from being energized before the proper time in the cycle, relay R8 has a blade 142 in circuit with the timer so that the timer can only be energized after relay R8 has been closed.

After the mold has been opened and the formed workpieces removed therefrom, the mold can be closed and a new cycle initiated.

By the present invention improved and more uniform plasticizing of the material can be had, the capacity of a machine of any given size is substantially increased, and a more rapid cycle of operation is obtained.

It has been mentioned that material is plasticized by working thereof by screw 24. It will be understood however that even if material were not completely plasticized by the screw, the advantage would obtain that the entire body of plastic material within the cylinder would be hot throughout, thereby greatly reducing the length of time the material would have to remain in the cylinder and substantially eliminate the possibility of faulty work pieces on account of unplasticized material.

It will also be understood that length of screw 24, particularly the portion disposed within cylinder 10 might be considerably longer then illustrated in order to provide for sufficient working of the material being processed to bring it completely to a plasticized condition or substantially so.

I claim:

1. In an apparatus for handling heat plasticizable material, a heated cylinder having a discharge nozzle at one end, a hopper structure attached to the cylinder at the other end, said hopper structure having a bore co-axial with the cylinder, a screw in the bore in the hopper structure having its one end disposed in the cylinder so that rotation of the screw will convey material from the hopper structure into the cylinder and compact the material therein, said screw being hollow and there being an injection plunger mounted in the screw adapted to project therefrom into the cylinder, a rotary hydraulic motor connected with the screw, a reciprocating hydraulic motor connected with the injection plunger, a source of fluid under pressure, and valves connecting the said source of fluid with the motors shiftable for causing selective actuation of said motors, the said valve for the rotary motor being of the closed center type so that the rotary motor is locked when its valve is centered and the other said valve for the reciprocating motor being of the open center type so that the pressure fluid from the source is by-passed when the said other valve is centered.

2. In an apparatus for handling heat plasticizable material; a heated cylinder having a discharge nozzle, a screw extending into the cylinder from the end opposite the nozzle rotatable for supplying material to be plasticized to the cylinder and for compacting it therein, an injection plunger reciprocable through the screw into the cylinder to displace plasticized material from the cylinder through the nozzle, a rotary hydraulic motor for driving the screw, a reciprocating hydraulic motor for driving the injection plunger, a source of fluid under pressure, means for supplying fluid from the source to the advancing side of the reciprocating hydraulic motor to cause advancing movement of the injection plunger, means responsive to a predetermined pressure developed on the advancing side of said reciprocating motor for reversing the supply of fluid thereto to cause retraction of the injection plunger, means responsive to the retraction of the injection plunger for initiating a supply of fluid to the rotary motor to drive the screw in its material advancing direction, means responsive to a predetermined pressure developed on the rotary motor for reversing the supply of fluid thereto to reverse the screw thereby to relieve the pressure on the material in the cylinder, and time controlled means operable thereafter to interrupt the supply of fluid to the said rotary motor.

3. In an apparatus for introducing heat plasticizable material into a heated cylinder having a nozzle and for discharging it when plasticized from the cylinder through the nozzle, a screw rotatable for advancing material into the cylinder and for compacting it therein, an injection plunger reciprocable through the screw for displacing material from the cylinder through the nozzle, a rotary hydraulic motor connected with the screw, a reciprocating hydraulic motor connected with the plunger, a source of fluid under pressure, a closed center reversing valve connecting the source with said rotary motor, an open center reversing valve connecting the source with said reciprocating motor, electrical means for shifting said valves to cause actuation of said motors, and pressure responsive means connected with the advancing sides of said motors for controlling said electrical means.

4. In an apparatus for introducing heat plasticizable material into a heated cylinder having a nozzle and for discharging it when plasticized from the cylinder through the nozzle, a screw rotatable for advancing material into the cylinder and for compacting it therein, an injection plunger reciprocable through the screw for displacing material from the cylinder through the nozzle, a rotary hydraulic motor connected with the screw, a reciprocating hydraulic motor connected with the plunger, a source of fluid under pressure, a closed center reversing valve connecting the source with said rotary motor, an open center reversing valve connecting the source with said reciprocating motor, first electrical means for shifting the open center valve in one direction to advance the injection plunger, second electrical means for shifting the open center valve to retract the injection plunger, third electrical means for shifting the closed center valve to supply fluid to the advancing side of the rotary motor, fourth electrical means to shift the closed center valve to supply fluid to the retracting side of the rotary motor, and pressure switches connected with the advancing sides of said motors to control said electrical means.

5. In an apparatus for introducing heat plasticizable material into a heated cylinder having a nozzle and for discharging it when plasticized from the cylinder through the nozzle, a screw rotatable for advancing material into the cylinder and for compacting it therein, an injection plunger reciprocable through the screw for displacing material from the cylinder through the nozzle, a rotary hydraulic motor connected with the screw, a reciprocating hydraulic motor connected with the plunger, a source of fluid under pressure, a closed center reversing valve connecting the source with said rotary motor, an open center reversing valve connecting the source with said reciprocating motor, first electrical means for shifting the open center valve in one direction to advance the injection plunger, second electrical means for shifting the open center valve to retract the injection plunger, third electrical means for shifting the closed center valve to supply fluid to the advancing side of the rotary motor, fourth electrical means to shift the closed center valve to supply fluid to the retracting side of the rotary motor, means to energize the first electrical means, means responsive to pressure on the advancing side of the reciprocating motor to de-energize the first electrical means and to energize the second electrical means, means responsive to retracting movement of the injection plunger for energizing said third electrical means, means responsive to a predetermined pressure on the advancing side of the rotary motor for energization of said fourth electrical means, and means responsive to a predetermined time delay after the energization of said fourth electrical means for de-energizing both the second and fourth electrical means.

6. In an apparatus for introducing heat plasticable material into a heated cylinder having a nozzle and for discharging it when plasticized from the cylinder through the nozzle, a screw rotatable for advancing material into the cylinder and for compacting it therein, an injection plunger reciprocable through the screw for displacing material from the cylinder through the nozzle, a rotary hydraulic motor connected with the screw, a reciprocating hydraulic motor connected with the plunger, a source of fluid under pressure, a closed center reversing valve connecting the source with said rotary motor, an open center reversing valve connecting the source with said reciprocating motor, first electrical means for shifting the open center valve in one direction to advance the injection plunger, second electrical means for shifting the open center valve to retract the injection plunger, third electrical means for shifting the closed center valve to supply fluid to the advancing side of the rotary motor, fourth electrical means to shift the closed center valve to supply fluid to the retracting side of the rotary motor, means for energizing said second electrical means to close off the fluid by-pass, means for then energizing said third electrical means to cause extrusion of the material from the cylinder, means responsive to pressure on the advancing side of said rotary motor for de-energizing said third electrical means and said second electrical means and for energizing said first electrical means to advance the injection plunger, means responsive to pressure developed on the advancing side of the reciprocating motor for de-energizing the first electrical means and energizing the second electrical means to retract the injection plunger, means responsive to retracting movement of the injection plunger for again energizing said third electrical means, means responsive to a second pressure on the advancing side of the rotary motor for de-energizing said third electrical means and for momentarily energizing said fourth electrical means for de-energizing said second electrical means.

References Cited in the file of this patent
UNITED STATES PATENTS

| | | |
|---|---|---|
| 2,595,455 | Heston | May 6, 1952 |
| 2,607,077 | Dulmage | Aug. 19, 1952 |
| 2,668,986 | Miler | Feb. 16, 1954 |
| 2,680,880 | Corbett | June 15, 1954 |
| 2,891,282 | Neitlich | June 23, 1959 |

FOREIGN PATENTS

| | | |
|---|---|---|
| 463,767 | Italy | May 31, 1951 |